United States Patent [19]

Covert

[11] Patent Number: 5,782,477
[45] Date of Patent: Jul. 21, 1998

[54] MATERIAL HANDLING DEVICE

[76] Inventor: Theodore Covert, Hudson St., Box 191. Glasco, N.Y. 12432

[21] Appl. No.: 634,838

[22] Filed: Apr. 19, 1996

[51] Int. Cl.$^6$ ....................................................... B62B 3/04
[52] U.S. Cl. .................. 280/79.7; 280/47.3; 280/47.32; 280/78
[58] Field of Search .................. 280/79.7, 47.3, 280/47.32, 78, 47.17; 414/11; 269/17, 905; D34/23

[56] References Cited

U.S. PATENT DOCUMENTS

| | | | |
|---|---|---|---|
| 722,569 | 3/1903 | Dilger | 280/47.32 X |
| 1,001,962 | 8/1911 | Landes | 280/47.3 X |
| 2,384,235 | 9/1945 | Burnett | 280/47.3 X |
| 2,466,149 | 4/1949 | Burg | 280/79.7 |
| 3,524,642 | 8/1970 | Aguilar | 280/47.3 X |
| 4,488,733 | 12/1984 | Hellster | 280/79.7 X |
| 4,630,838 | 12/1986 | Stockton | 280/47.17 |
| 5,221,066 | 6/1993 | Ferrigan et al. | 280/79.7 X |
| 5,288,090 | 2/1994 | Bross | 269/905 X |

FOREIGN PATENT DOCUMENTS

| | | | |
|---|---|---|---|
| 1069560 | 1/1980 | Canada | 280/47.3 |
| 374355A | 6/1990 | European Pat. Off. | 280/47.3 |

*Primary Examiner*—Stephen Gordon

[57] ABSTRACT

A material handling device for the easy movement of large sheets or other material by one person. A support bar has an upper section, a middle section and a lower section. A handle is mounted on the upper section and a wheel is mounted to be rotatable on the lower section and an L-shaped support is also mounted on the lower section opposite the wheel. The upper section is bent at an acute angle over the wheel.

3 Claims, 3 Drawing Sheets

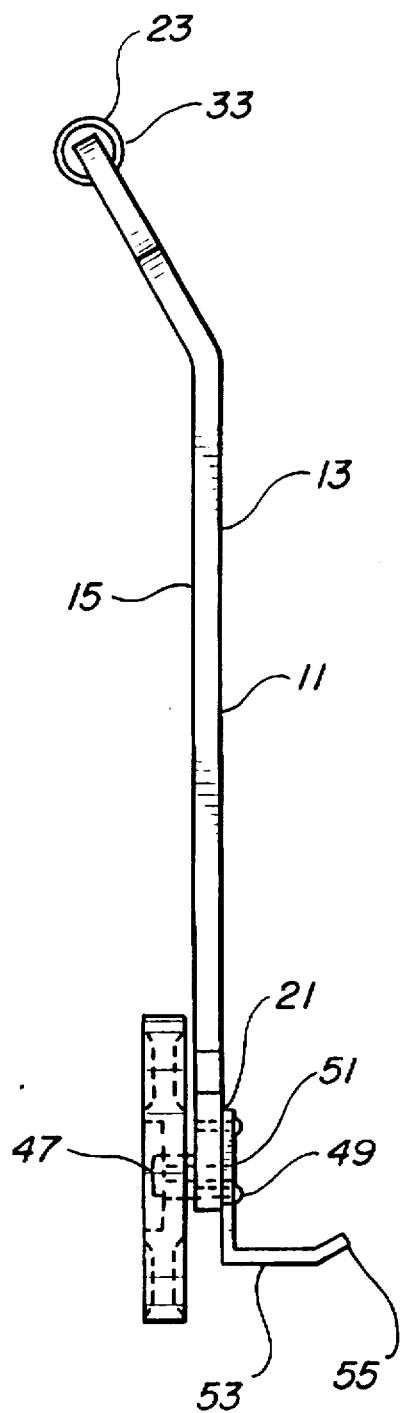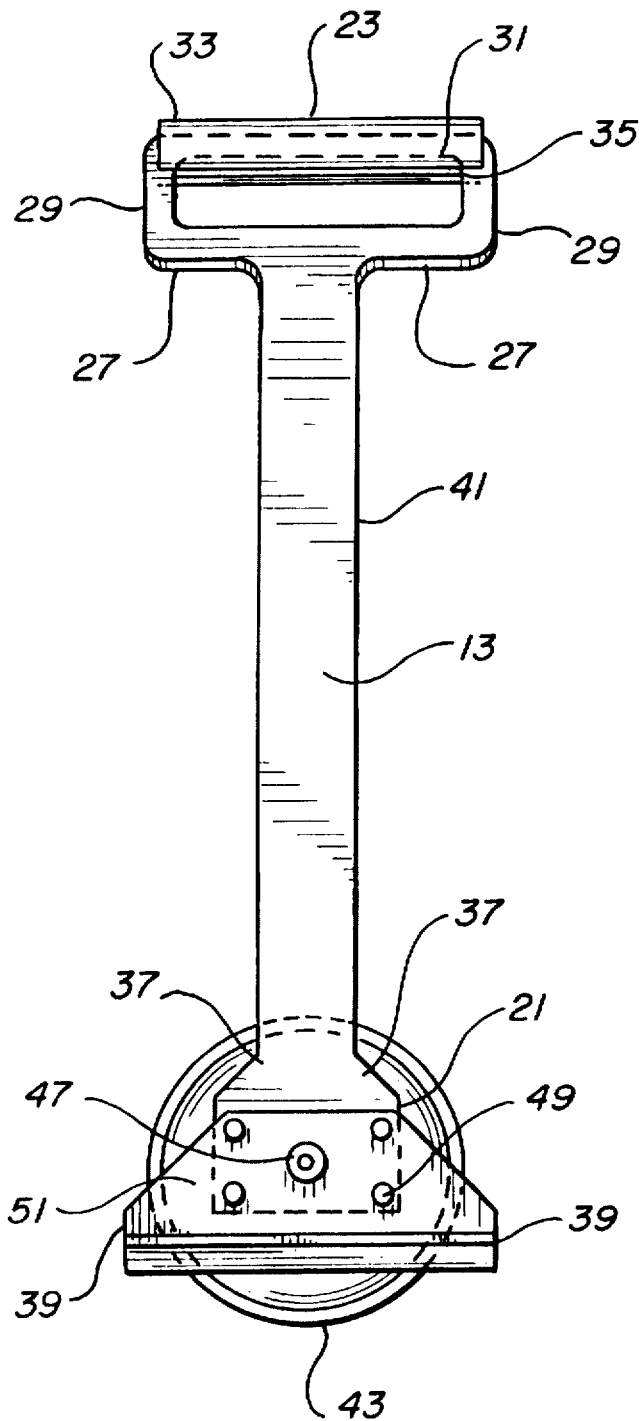

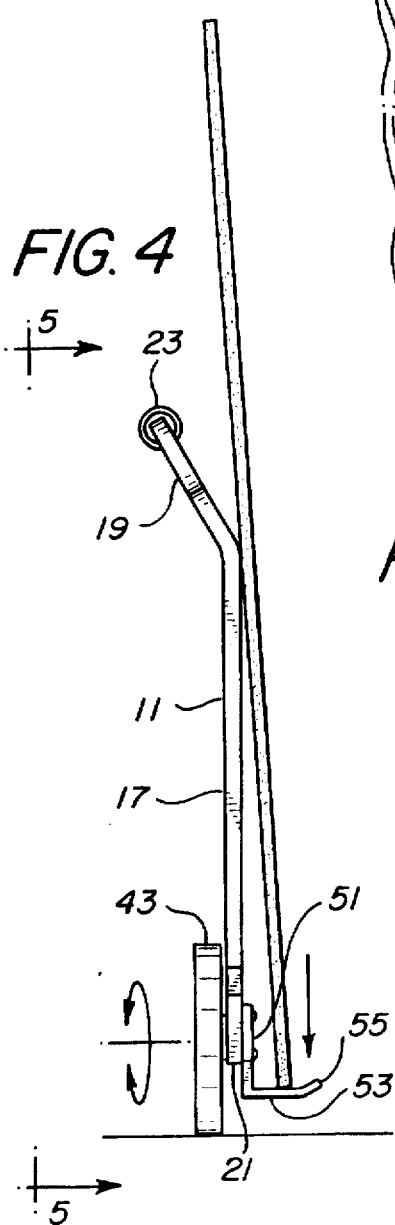
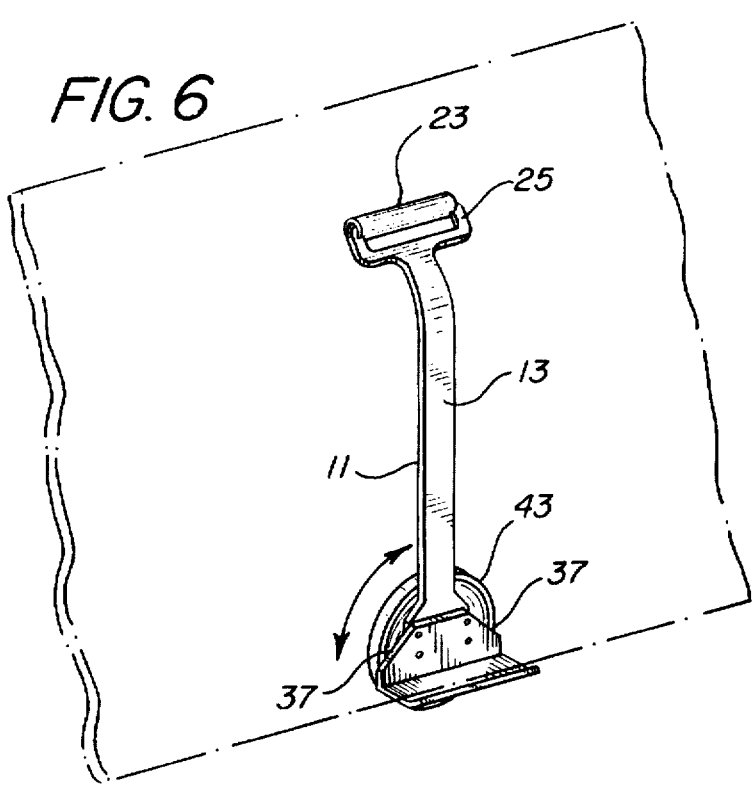
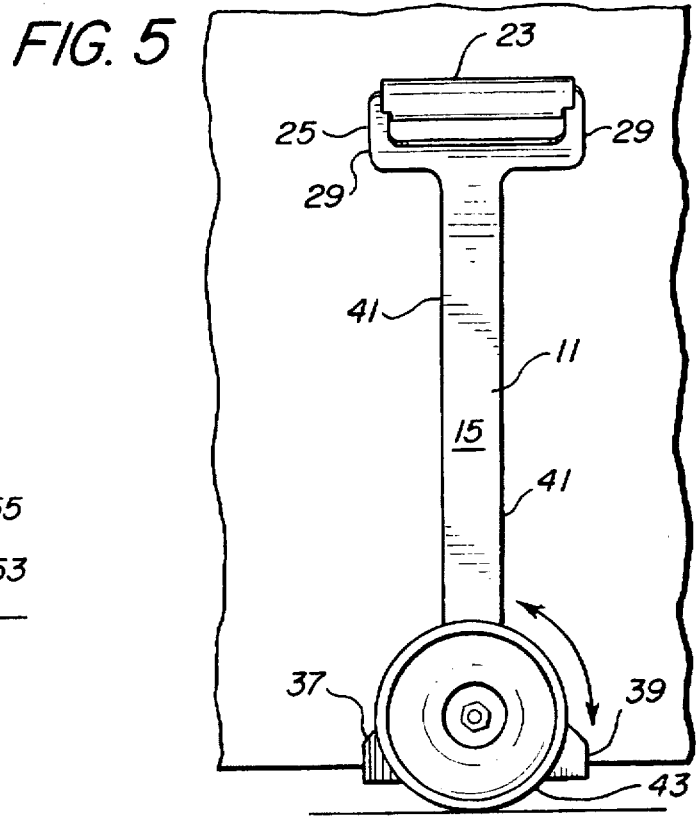

MATERIAL HANDLING DEVICE

BACKGROUND OF THE INVENTION

It is well known that the movement of large sheets of material is awkward and difficult even for two persons. One example of such sheets is the well-known sheet rock or plaster board used in dry wall construction. Another example is paneling or other types of plywood used in construction and renovation work.

This invention provides a device on which the sheets can be placed and then rolled along without bending of the sheet and with the sheet held at an acute angle to the vertical thus providing easy movement through doorways and corridors of limited width. In this way, the need for two workers is eliminated and the material is protected against breaking and the strain of lifting is eliminated.

SUMMARY OF THE INVENTION

In accordance with the present invention, a support bar, preferably with a rectangular cross section, is provided. The support bar has an upper section and a middle section and a lower section. The upper section is substantially shorter than the middle section and the lower section is shorter than the upper section. The upper section is bent at an acute angle to the middle section. A handle is mounted on the upper end. A wheel is mounted to be rotatable on the lower end underneath the handle. The lower section is aligned with the middle section but has a wider surface but with the same thickness as the middle section and the upper section. The L-shaped support extends from the lower section of the support bar slightly above the lowest point of the wheel and has a lip extending in the direction of the handle. Material is rested on the L-shaped support and is held on the L-shaped support by the lip and the material is rested on the support bar held by a worker by the handle which is sufficiently bent back from the sheet.

It is an object of the present invention to provide a device which makes it possible for one person to move materials.

It is another object of the present invention to provide a device for moving materials which is both durable and inexpensive.

It is another object of the present invention to provide a device for moving materials which is light in weight and easily stored.

The subject matter of the present invention is particularly pointed out and distinctly claimed in the concluding portion of the specification. However, both the organization and method of operation, together with further advantages and objects thereof, may be best understood by reference to the following description taken in connection with the accompanying drawings wherein like reference characters refer to like elements.

DESCRIPTION OF THE DRAWINGS

FIG. 2 is a side elevation of the material handling device.

FIG. 3 is a front elevation of the material handling device.

FIG. 4 is a side elevation of the material handling device similar to FIG. 2 but with a sheet of material mounted on the material handling device.

FIG. 5 is a view along line 5—5 of FIG. 4 showing the rear of the material handling device with a sheet of material on the device.

FIG. 6 is a perspective view of the front and side of the material handling device with a sheet of material on the material handling device shown in phanten.

DETAILED DESCRIPTION OF THE INVENTION

Figure 1:
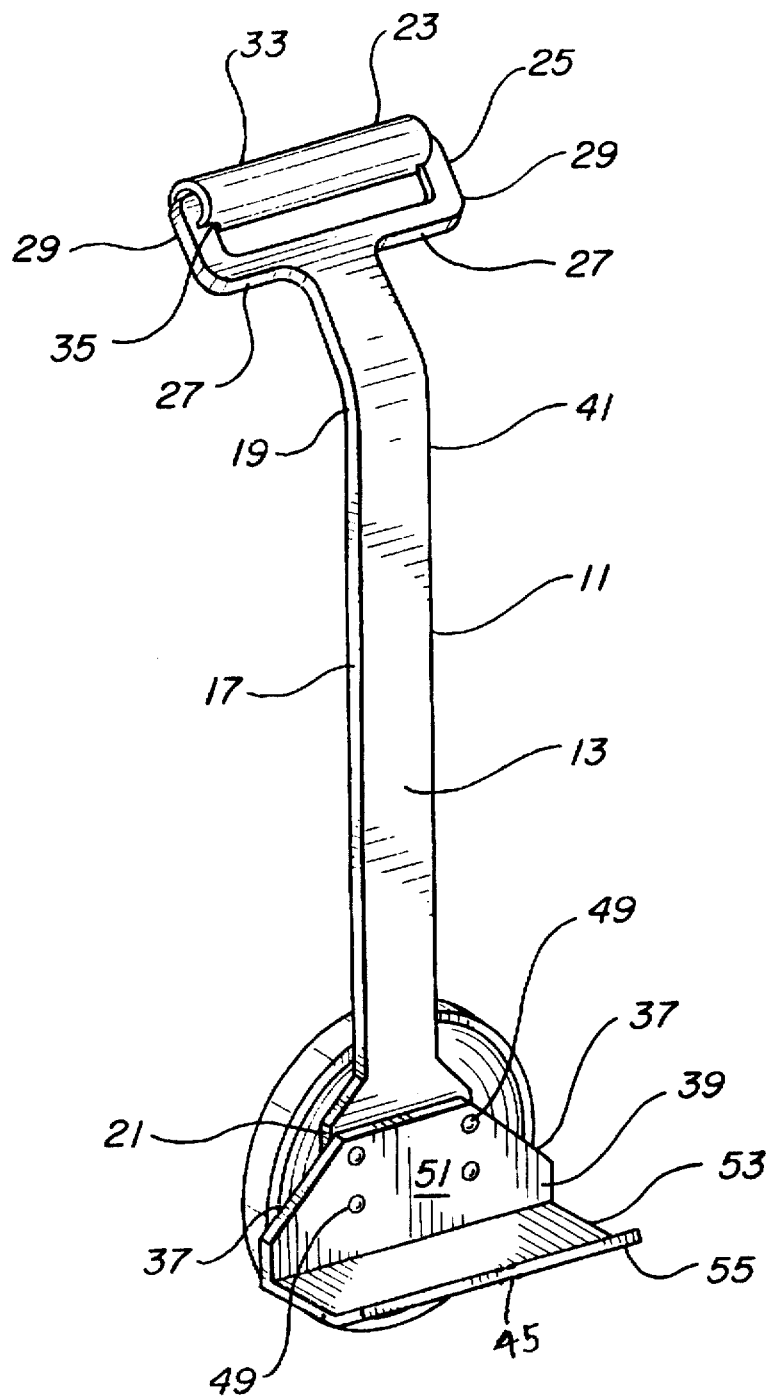
FIG. 1 is a pictorial view of the material handing device.

Referring now to FIG. 1, the material handling device is shown. The material handling device includes a support bar 11 which is preferably made from a metal stock with a rectangular cross section with a width substantially greater than the thickness of the stock. The support bar 11 has a face surface 13 formed by the width and length of the support bar 11. Opposite the face surface 13 is a rear surface 15 also formed by the width and length of the support bar 11. The support bar 11 has three sections, namely a middle section 17, an upper section 19 and a lower section 21.

The middle section 17 is substantially longer than the upper section 19 and the upper section 19 is longer than the lower section 21. The upper section 19 is a continuation of the middle section 17 but is bent at an acute angle to the middle section 17, the support bar 11 being bent back over the rear surface 15. The upper section 19 includes a yoke 25 which is an oblong O-shaped member located at the upper end 23 of the upper section 19; the upper end 23 being the end most remote from the middle section 17. The yoke 25 is formed from bar stock having a thickness substantially the same as the thickness of the support bar 11. The yoke 25 lies generally in the same plane as the face surface 13 and rear surface 15 of the upper section 19. The yoke 25 includes two base members 27 each extending from the upper end 23 of the upper section 19 at substantially right angles to the support bar 11. Two side members 29 extend at right angles to the two base members 27 and are generally parallel to the upper section 19. A top member 31 extends between the ends of the two side members 29 and is generally parallel to the two base members 27. In order to provide a comfortable grip of the material handling device, a tubular member 33 is provided to cover the top member 31. The tubular member 33 is split and opened and then pressed back together around the top member 31. Notches 35 are formed in the tubular member 33 at its ends where the split is located. These notches 35 fit over the two side members holding the tubular member 33 in place.

The lower section 21 of the support bar 11 has a width which is broader than the middle section 17 and the upper section 19. The front surface 13 and the rear surface 15 expand symmetrically on both sides of the middle section 17. Preferably, the lower section 21 slopes down and outwardly from the middle section 17 along two angular edges 37. From the angular edges 37, the lower section 21 has two side edges 39 generally parallel to the side edges 41 of the middle section 17 and the upper section 19 but farther apart.

The lower section 21 requires that the face surface 13 be broader as there is mounted on the lower section 21 a wheel 43 and an L-shaped support 45. The wheel 43 is mounted to rotatable on the rear surface 15 of the lower section 21 As best seen in FIG. 2 and FIG. 3, an axle 47 is secured to the lower section 21 and the wheel 43 is rotatable mounted on the axle 47. On the face surface 13 of the lower section 21, the L-shaped support 45 is mounted by any suitable means such as bolts 49 threaded into the face surface 13 of the lower section 21. The L-shaped support member 45 has a back member 51 and a forward member 53 which is located substantially at right angles to the back member 51 and protrudes outwardly away from the lower section 21. The wheel 43, mounted on the rear surface 15 of the lower section 21, extends away from the middle section 17 beyond the lower section 21 a greater distance than the L-shaped support member 45. In this way, when the wheel 43 is placed on the ground, the L-shaped support member 45 will be slightly above the ground.

The forward member 53 extends from the back member 51 to which it is solidly affixed and the forward member 53 has a lip 55 at its edge most remote from the back member 51. The lip 55 bends at an acute angle to the rest of the forward member 53 of which it is a part in the direction of the middle section 17.

As best seen in FIG. 5 and FIG. 6, the operator places his or her hand on the tubular member 33. The lower edge of the sheet or sheets being moved is placed on the forward member 53 and is kept from sliding off by the lip 55. The sheet of material is rested, as best seen in FIG. 4, against the face surface 13 of the middle section 17 at the juncture point of the middle section 17 and the upper section 19. The upper section 19, as previously described, bends away from the middle section 17 back over the wheel 43 and thus away from the sheet of material being moved, so that the hand of the operator is not pressed by the sheet or sheets of material. By resting the wheel 43 on the ground, the operator moves the sheet smoothly along the ground. The sheet of material is held in a near upright position so as not to bend—which frequently results in breakage.

The material handling device may be used with great advantage for moving objects and material other than sheet material. As for example, a cabinet, such as a filing cabinet can be most effectively moved by the material handling device. Actually, just about any object which can rest on the forward edge and against the middle section, can be moved with the material handling device by one person with limited physical strength.

The material handling device can be made from steel which provides extreme strength but can be made with adequate strength and be much lighter in weight when produced from aluminum and even from a strong plastic or fiberglass.

Thus, while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A material handling device comprising:

a support bar having an upper section, a middle section and a lower section, the upper section being substantially shorter than the middle section and the lower section being shorter than the middle section, the support bar having a rectangular cross-section with a width substantially greater than its thickness and having a face surface and a rear surface, the upper section being bent at an acute angle to the middle section over the rear surface, the lower section having a width greater than the middle section and the upper section;

a handle mounted on the upper section remote from the middle section;

an axle secured to the rear surface of the lower section;

a wheel mounted on the axle to be rotatable on the axle adjacent the rear surface of the lower section; and an L-shaped support member rigidly mounted on the face surface of the lower section, the L-shaped support member having a back member and a forward member, the forward member and the back member being adjacent to the face surface, the forward member including a lip remote from the back member bent at an acute angle to the forward member and toward the upper section, the wheel extending further from the lower section away from the middle section than the forward member.

2. A material handling device according to claim 1 wherein the upper section has an upper end and wherein the handle includes:

two base members extending at right angles to the upper end of the upper section;

two side members at right angles to the two base members and generally parallel to the upper section; and a top member extending between the side members and generally parallel to the base members.

3. A material handling device according to claim 1 wherein the upper section has an upper end and wherein the handle includes:

two base members extending at right angles to the upper end of the upper section;

two side members at right angles to the two base members and generally parallel to the upper section;

a top member extending between the side members and generally parallel to the base members; and a tubular member pressed over the top member.

* * * * *